United States Patent
Denton et al.

(10) Patent No.: US 9,845,747 B2
(45) Date of Patent: Dec. 19, 2017

(54) INTERNAL COMBUSTION ENGINE HAVING DEDICATED EGR CYLINDER(S) WITH SPLIT FUEL INJECTION TIMING

(71) Applicant: Southwest Research Institute, San Antonio, TX (US)

(72) Inventors: Bradley D. Denton, San Antonio, TX (US); Raphael Gukelberger, San Antonio, TX (US); Christopher J. Chadwell, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 110 days.

(21) Appl. No.: 15/154,966

(22) Filed: May 14, 2016

(65) Prior Publication Data

US 2017/0328289 A1  Nov. 16, 2017

(51) Int. Cl.
| | |
|---|---|
| *F02M 25/07* | (2006.01) |
| *F02D 41/00* | (2006.01) |
| *F02M 26/43* | (2016.01) |
| *F02B 47/10* | (2006.01) |
| *F02D 41/34* | (2006.01) |

(52) U.S. Cl.
CPC .......... *F02D 41/0052* (2013.01); *F02B 47/10* (2013.01); *F02D 41/345* (2013.01); *F02M 26/43* (2016.02)

(58) Field of Classification Search
CPC ............... F02M 25/07; F02M 25/0707; F02M 25/0772; F02D 2021/083; F02D 41/0062; F02D 41/0072
USPC .......................... 123/568.11, 568.14, 568.19, 123/568.21–568.26; 701/108
See application file for complete search history.

(56) References Cited

U.S. PATENT DOCUMENTS

| | | | |
|---|---|---|---|
| 2013/0220286 A1* | 8/2013 | Gingrich | F02D 41/0065 123/568.11 |
| 2014/0196702 A1* | 7/2014 | Gingrich | F02D 41/0065 123/568.21 |
| 2014/0360461 A1* | 12/2014 | Ulrey | F02M 26/43 123/299 |
| 2015/0219028 A1* | 8/2015 | Gingrich | F02M 26/43 123/445 |
| 2016/0245239 A1* | 8/2016 | Henry | F02M 26/35 |
| 2016/0333830 A1* | 11/2016 | Henry | F02M 26/40 |

* cited by examiner

*Primary Examiner* — John Kwon
(74) *Attorney, Agent, or Firm* — Livingston Law Firm

(57) ABSTRACT

A method of controlling fuel injection to the cylinders of an internal combustion engine, the engine having exhaust gas recirculation (EGR) from at least one dedicated EGR (D-EGR) cylinder, with the other cylinders being main cylinders. The D-EGR cylinder is run at a richer equivalence ratio than the main cylinders, with the goal of providing increased H2 and CO in the recirculated exhaust. The rich limit of the D-EGR cylinder is maximized by dividing the fuel injection into multiple fuel injection events, with each fuel injection event occurring during the intake valve lift period of the engine cycle.

9 Claims, 4 Drawing Sheets

INTERNAL COMBUSTION ENGINE HAVING DEDICATED EGR CYLINDER(S) WITH SPLIT FUEL INJECTION TIMING

TECHNICAL FIELD OF THE INVENTION

This invention relates to internal combustion engines, and more particularly to such engines having one or more cylinders dedicated to production of recirculated exhaust.

BACKGROUND OF THE INVENTION

In an internal combustion engine system having dedicated EGR (exhaust gas recirculation), one or more cylinders of the engine are segregated and dedicated to operate in a rich combustion mode. As a result of the rich combustion, the exhaust gases from the dedicated cylinder(s) include increased levels of hydrogen and carbon monoxide. Rich combustion products such as these are often termed "syngas" or "reformate".

Dedicated EGR engines use the reformate produced by the dedicated cylinder(s) in an exhaust gas recirculation (EGR) system. The hydrogen-rich reformate is ingested into the engine for subsequent combustion by the non-dedicated cylinders and optionally by the dedicated cylinder(s). The reformate is effective in increasing knock resistance and improving dilution tolerance and burn rate. This allows a higher compression ratio to be used with higher rates of EGR and reduced ignition energy, leading to higher efficiency and reduced fuel consumption.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to various systems and methods for a dedicated EGR system installed in a vehicle, such as an automobile. As explained herein, a dedicated EGR cylinder can operate at any equivalence ratio because its exhaust will never exit the engine before passing through another cylinder operating at a stoichiometric air-fuel ratio. This allows the dedicated EGR cylinder to run rich, which produces hydrogen (H2) and CO at levels that enhance combustion flame speeds, combustion, and knock tolerance of all the cylinders.

A problem with operation of a dedicated EGR cylinder at richer than stoichiometric air-fuel ratios is that above a "rich limit", combustion stability is adversely affected. Because of this combustion stability limitation, the amount of $H_2$ and CO that can be produced in-cylinder is also limited. This invention is directed to a system and method to increase the rich combustion stability limit of dedicated D-EGR cylinder(s), thereby allowing for increased production of $H_2$ and CO.

Conventional Dedicated EGR System (Prior Art)

Figure 1:
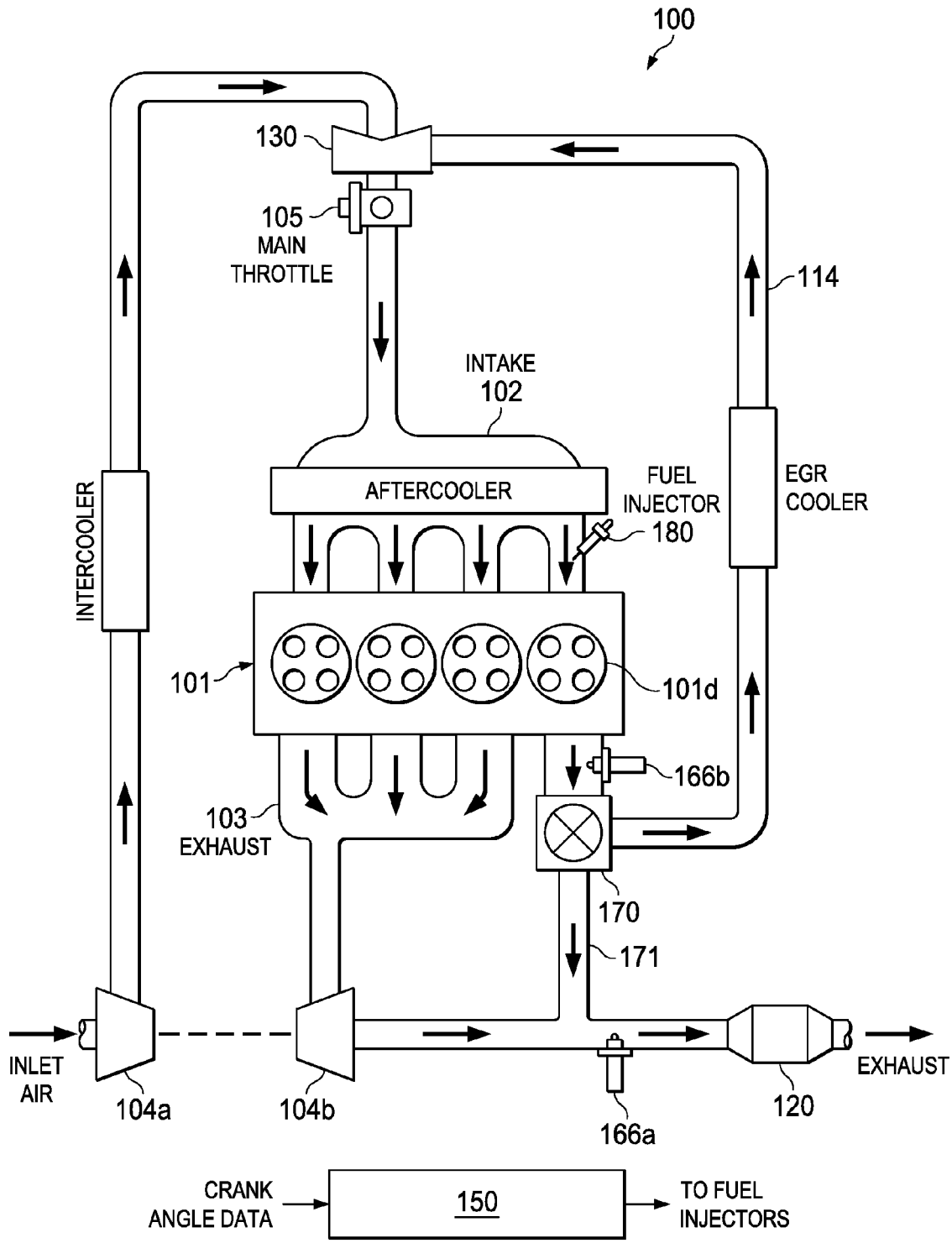
FIG. 1 illustrates a four cylinder engine with one dedicated EGR cylinder.

FIG. 1 illustrates an internal combustion engine 100 having four cylinders 101. One of the cylinders is a dedicated EGR cylinder, and is identified as cylinder 101d. In the example of FIG. 1, engine 100 is gasoline-fueled and spark-ignited, with each cylinder 101 having an associated spark plug.

The dedicated EGR cylinder 101d may be operated at any desired air-fuel ratio. All of its exhaust is recirculated back to the intake manifold 102.

In the embodiment of FIG. 1, the other three cylinders 101 (referred to herein as the "main" or "non dedicated" cylinders) are operated at a stoichiometric air-fuel ratio. Their exhaust is directed to an exhaust aftertreatment system via an exhaust manifold 103.

Engine 100 is equipped with a turbocharger, specifically a compressor 104a and a turbine 104b.

Although not explicitly shown, all cylinders 101 have some sort of fuel delivery system for introducing fuel into the cylinders. The fuel delivery system to the main cylinders can be fumigated, port injected, or direct injected. As explained below, fuel delivery to the dedicated EGR cylinder 101d is independently controlled, and uses a fuel injector 180 capable of performing "split injections".

In the example of this description, the EGR loop 114 joins the intake line downstream the compressor 104a. A mixer 130 mixes the fresh air intake with the EGR gas. A main throttle 105 is used to control the amount of intake (fresh air and EGR) into the intake manifold 102.

In the embodiment of this description, a three-way valve 170 controls the flow of dedicated EGR to the EGR loop or to the exhaust system. Other configurations for controlling EGR flow are possible, such as an EGR valve just upstream of mixer 130.

The four-cylinder dedicated EGR system 100 with a single dedicated cylinder can provide a 25% EGR rate. In other dedicated EGR systems, there may be a different number of engine cylinders 101, and/or there may be more than one dedicated EGR cylinder 101d. In general, in a dedicated EGR engine configuration, the exhaust of a sub-group of cylinders can be routed back to the intake of all the cylinders, thereby providing EGR for all cylinders. In some embodiments, the EGR may be routed to only the main cylinders.

After entering the cylinders 101, the fresh-air/EGR mixture is ignited and combusts. After combustion, exhaust gas from each cylinder 101 flows through its exhaust port and into exhaust manifold 103. From the exhaust manifold 103, exhaust gas then flows through turbine 104b, which drives compressor 104a. After turbine 104b, exhaust gas flows out to a main exhaust line 119 to a three-way catalyst 120, to be treated before exiting to the atmosphere.

As stated above, the dedicated EGR cylinder 101d can operate at any equivalence ratio because its exhaust will not exit the engine before passing through a non-dedicated EGR cylinder 101 operating at a stoichiometric air-fuel ratio. Because only stoichiometric exhaust leaves the engine, the exhaust aftertreatment device 120 may be a three-way catalyst.

To control the air-fuel ratio, exhaust gas may be sampled by an exhaust gas oxygen (EGO) sensor. Both the main exhaust line 122 and the EGR loop 114 may have a sensor (identified as 166a and 166b), particularly because the dedicated EGR cylinder may be operated at a different air-fuel ratio than non-dedicated cylinders.

If a dedicated EGR cylinder is run rich of stoichiometric A/F ratio, a significant amount of hydrogen (H2) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as improving low speed peak torque results, due to increased EGR tolerance and the knock resistance provided by hydrogen (H2) and carbon monoxide (CO).

An EGR control unit 150 has appropriate hardware (processing and memory devices) and programming for controlling the EGR system. It may be incorporated with a larger more comprehensive control unit. Regardless of division of tasks, it is assumed there is control to receive data from the sensors described above, and perform various EGR control algorithms. Control signals are generated for the various valves and other actuators of the EGR system. Fuel delivery is controlled such that the dedicated EGR cylinder operates at an equivalence ratio greater than that of the main cylinders, and as described below, control is provided for fuel injection timing.

Rich Limit of Dedicated EGR Cylinder

As stated above, a problem with too rich operation of the dedicated EGR cylinder 101d is that its combustion stability is adversely affected. In other words, a dedicated EGR cylinder 101d has a "rich limit". Because of this limitation, the amount of beneficial $H_2$ and CO that can be produced in-cylinder is also limited.

Figure 2:
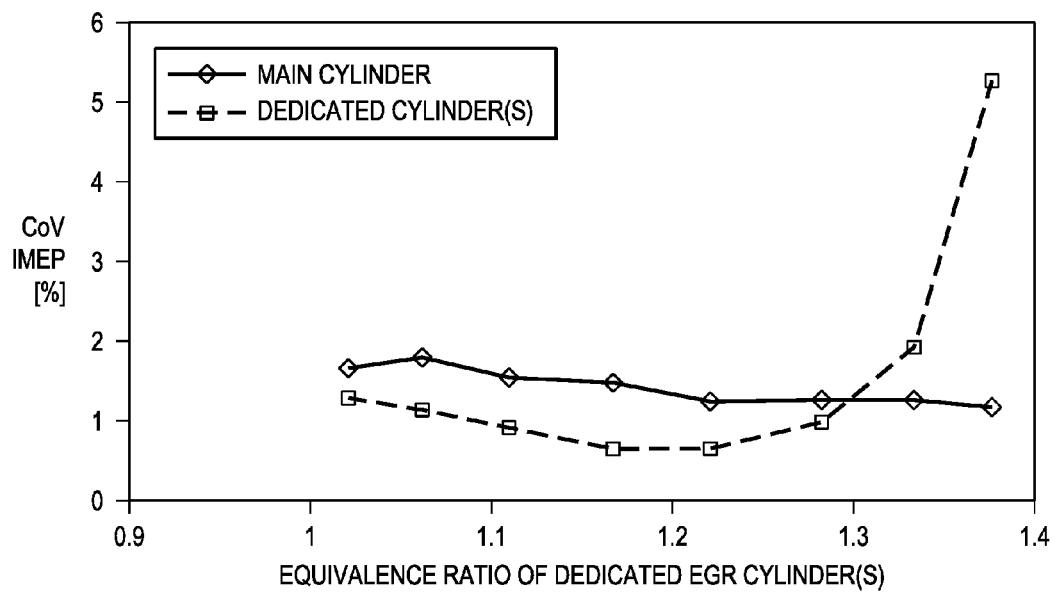
FIG. 2 illustrates the effect of increasing the equivalence ratio of the dedicated EGR cylinder(s) on combustion stability.

FIG. 2 illustrates the effect of enriching the equivalence ratio of dedicated EGR cylinder(s) on the coefficient of variation (CoV) of indicated mean effective pressure (IMEP) for both the dedicated EGR cylinder(s) and the main cylinders. The CoV IMEP is a measure of combustion stability, with a low value indicating good combustion stability.

An increase in the equivalence ratio of the dedicated EGR cylinder improves (decreases) the CoV IMEP of the main cylinders. However, at the same time, enriching the dedicated EGR cylinder(s) equivalence ratio degrades the CoV IMEP in the D-EGR cylinder. In the absence of the method described herein, the maximum enrichment in the dedicated EGR cylinder is conventionally limited to an equivalence ratio of about 1.4.

Multiple Fuel Injection to Increase Rich Limit

Figure 3:
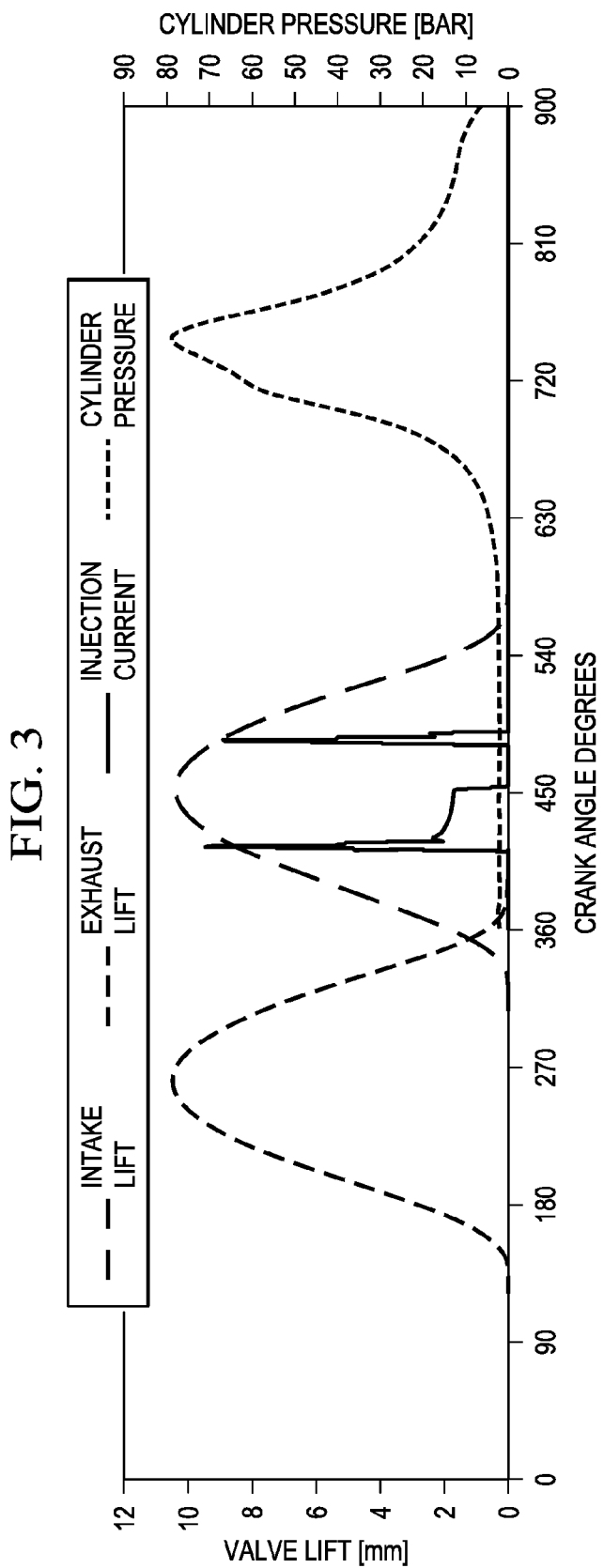
FIG. 3 illustrates the division of fuel injection into multiple injection events, all during the intake valve lift period.

FIG. 3 illustrates a multiple fuel injection method for improving the rich limit of dedicated EGR cylinder(s). As indicated above, this increase in the rich limit provides an opportunity for increased H2 and CO production in the recirculated exhaust produced by the dedicated EGR cylinder(s).

The engine is assumed to be like the engine of FIG. 1, having a single dedicated EGR cylinder 101d and three main cylinders 101. At least the dedicated EGR cylinder 101d has a fuel injector 180 for direct fuel injection. The fuel injector for the dedicated EGR cylinder can be controlled independently of the fuel injectors for the main cylinders, so as to provide multiple fuel injection events per engine cycle.

The method is implemented with appropriate programming of control unit 150. Control unit 150 receives data representing the valve lift position, which may be crank angle data. It generates control signals to the fuel injectors to command fuel injection. The main cylinders 101 are fueled in a manner conventional for the engine. The dedicated EGR cylinder 101d is fueled in the manner described herein.

In the example of FIG. 3, there are two fuel injections, that is, the fuel injection is divided into two fuel injection events. However, the method is not limited to two fuel injection events, and three or more could be performed.

Also, in the example of this description, the fuel amount is divided equally between the fuel injection events. However, other distributions are possible. The total fuel amount for the fuel injection events is calculated to provide a desired equivalence ratio.

The two fuel injection events are indicated by two peaks. Each peak represents a commanded control current to the fuel injector of the dedicated EGR cylinder.

As illustrated in FIG. 3, the fuel injection events were commanded and occur during the open intake valve period of the induction stroke. In terms of crank angle degrees, the multiple injections occur between 360 and 540 crank angle degrees, during the intake valve lift period.

In the example of FIG. 3, the fuel injections occur at approximately 400 and 500 crank angle degrees. This timing places the injections evenly on either side of the intake lift maximum at 450 crank angle degrees, spaced about 100 crank angle degrees apart. Many other timing strategies for the multiple injections are possible within the intake valve lift period.

In experimentation, multiple fuel injections were tested both during the open and closed intake valve periods of the engine cycle. All injections were completed before the start of combustion. This injection timing makes the use of multiple injections for rich limit extension a fundamentally different process than a post injection strategy, where multiple injections are used to inject fuel after the start of combustion.

Figure 4:
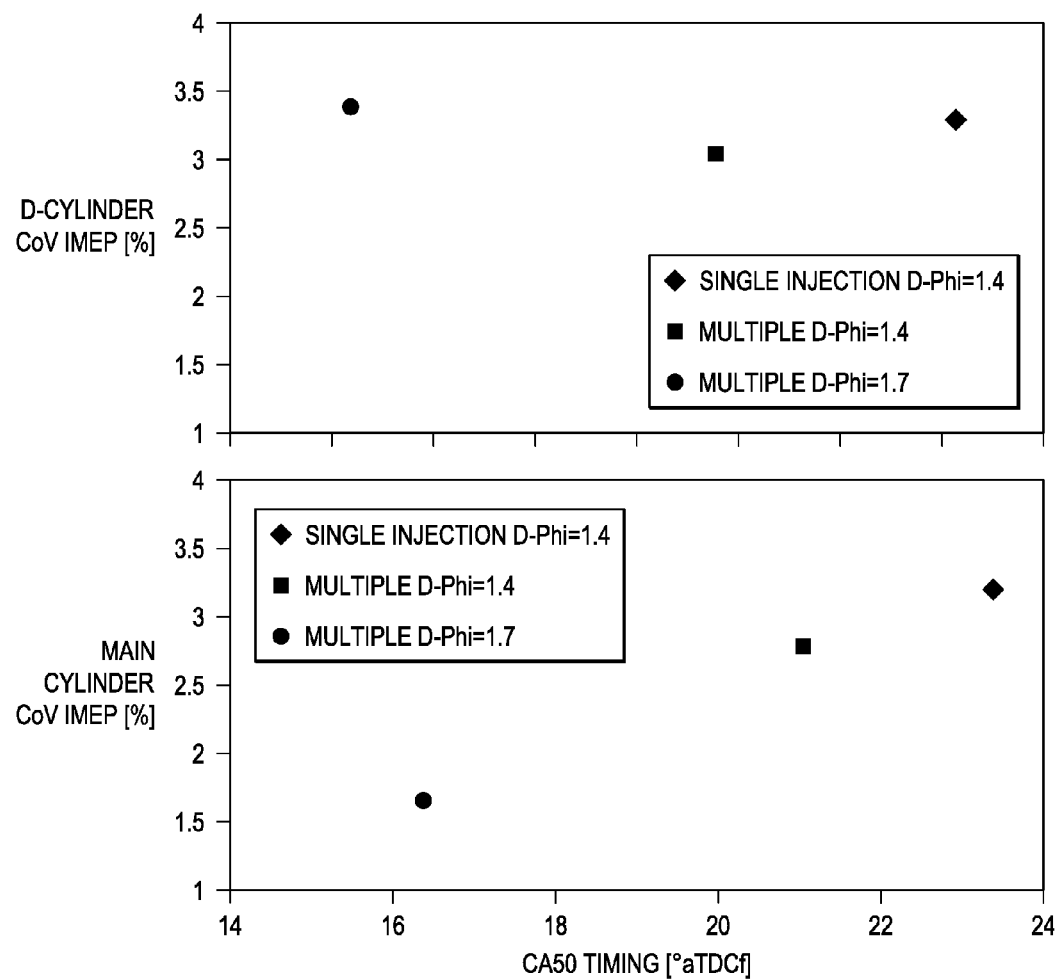
FIG. 4 illustrates how multiple injection events allow increased equivalence ratios with no adverse effect on combustion stability of the main cylinders.

FIG. 4 compares the CoV IMEP effect for single versus multiple fuel injection events to the dedicated EGR cylinder, performed in the manner illustrated in FIG. 3. The CoV IMEP is shown for the dedicated EGR cylinder (top) and main cylinders (bottom). The load is assumed constant.

For a single fuel injection event, at an equivalence ratio of 1.4, the IMEP for all cylinders (dedicated and main) is above 3%. However, at the same equivalence ratio of 1.4, two fuel injection events result in an improved CoV IMEP metric for all cylinders. As stated above, the improved CoV IMEP metric indicates improved combustion stability.

This additional stability margin allows for fueling to be increased over 20% when compared to the single fuel injection. As illustrated, the equivalence ratio of the dedicated EGR cylinder can be increased to about 1.7 and still maintain combustion stability.

Stated another way, with multiple injection events, the equivalence ratio for the dedicated EGR cylinder can be greater than with a single injection event, without loss of combustion stability to the main cylinders.

The CA50 timing on the x-axis of FIG. 4 is an industry standard metric of combustion phasing. More specifically, CA50 timing is the crank angle (CA) where 50% of the fuel in the cylinder has been consumed. Typically, this is optimized when CA50 is about 8 degrees, but a higher loads, knocking can occur, requiring the crank angle to be later than 8 degrees, causing a reduction in engine efficiency. Not only does the use of multiple injections permit richer operation at a similar stability level, but further permits operable at more favorable combustion phasing.

Figure 5:
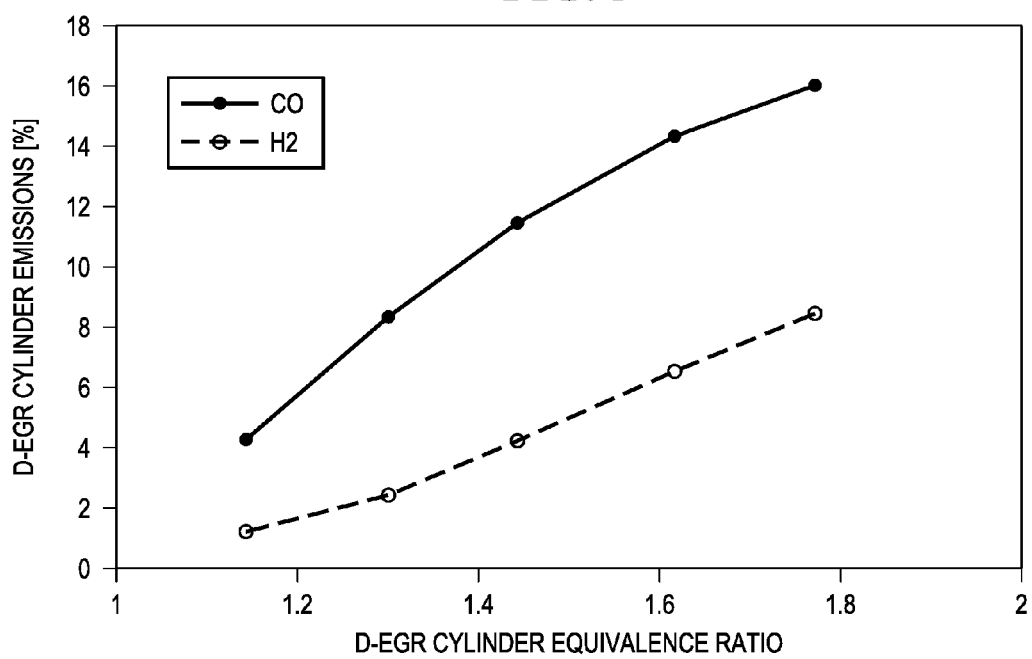
FIG. 5 illustrates how the increased equivalence ratio of the dedicated EGR cylinder(s) results in increased H2 and CO in the recirculated exhaust.

FIG. 5 illustrates the H2 and CO measured in the emissions of the dedicated EGR cylinder, with multiple fuel injections as performed in FIG. 3 at varying equivalence ratios. An increase in equivalence ratio from about 1.4 to about 1.7, nearly doubles the H2 production of the dedicated EGR cylinder, from about 3.8 to about 7.8%.

Thus, the multiple fuel injection provides the opportunity for an increased rich limit of the dedicated EGR cylinder, which provides increased H2 and CO in the recirculated exhaust. The additional H2 and CO produced from the extended rich limit improves main cylinder stability, knock resistance, and combustion phasing. This has a direct impact on improving engine efficiency and emissions.

What is claimed is:

1. A method of controlling fuel injection to the cylinders of an internal combustion engine, the engine having exhaust gas recirculation (EGR) from at least one dedicated EGR (D-EGR) cylinder, with the other cylinders being main cylinders, comprising:

for only the dedicated EGR cylinder:
dividing the fuel injection at each engine cycle into two or more fuel injection events;
wherein each fuel injection event occurs during the intake valve lift period of the engine cycle;
wherein the total amount of fuel injected during the multiple injection events provides a D-EGR cylinder equivalence ratio that is greater than could be achieved with a single injection event without loss of combustion stability to the main cylinders; and
for the main cylinders, providing fuel injection at a main cylinder equivalence ratio lower than the D-EGR equivalence ratio.

2. The method of claim 1, wherein the multiple injection events are two in number.

3. The method of claim 1, wherein the multiple injection events are more than two in number.

4. The method of claim 1, wherein the D-EGR equivalence ratio is greater than 1.4.

5. The method of claim 1, wherein the multiple injection events occur between 400 and 500 crank angle degrees.

6. The method of claim 1, wherein the injection events are evenly spaced on either side of the intake lift maximum.

7. The method of claim 1, wherein the fuel amount per engine cycle is divided equally between fuel injection events.

8. The method of claim 1, wherein the multiple injection events are 100 crank angle degrees apart or less.

9. An improved internal combustion engine, the engine having a number of cylinders, each cylinder having an associated fuel injector, comprising:

at least one cylinder operable as a dedicated exhaust gas recirculation (D-EGR) cylinder, with the other cylinders being main cylinders;
an EGR loop for recirculating all of the exhaust of the dedicated EGR cylinder to the main cylinders;
a control unit programmed to control the timing of fuel injections to the D-EGR cylinder such that the fuel injection at each engine cycle is divided into two or more fuel injection events, and each fuel injection event occurs during the intake valve lift period of the engine cycle;
wherein the control unit is further programmed to control the total amount of fuel injected during the multiple injection events provides a D-EGR cylinder equivalence ratio that is greater than the equivalence ratio of fuel provided to the main cylinders.

* * * * *